United States Patent [19]

Temme

[11] 4,265,359

[45] May 5, 1981

[54] SCRAPER ASSEMBLY FOR A SCRAPER CHAIN CONVEYOR

[75] Inventor: Helmut Temme, Waltrop, Fed. Rep. of Germany

[73] Assignee: Gewerkschaft Eisenhutte Westfalia, Lunen, Fed. Rep. of Germany

[21] Appl. No.: 14,509

[22] Filed: Feb. 23, 1979

[30] Foreign Application Priority Data

Feb. 24, 1978 [DE] Fed. Rep. of Germany ....... 2807883

[51] Int. Cl.³ .............................................. B65G 19/24
[52] U.S. Cl. ..................................... 198/731; 198/733
[58] Field of Search ............... 198/731, 733, 725, 728, 198/729, 734, 748

[56] References Cited

U.S. PATENT DOCUMENTS

| 3,653,492 | 4/1972 | Temme | 198/731 |
| 3,955,666 | 5/1976 | Braun et al. | 198/731 |
| 4,079,833 | 3/1978 | Rollins | 198/733 |

FOREIGN PATENT DOCUMENTS

| 608776 | 7/1932 | Fed. Rep. of Germany | 198/728 |
| 2031875 | 1/1972 | Fed. Rep. of Germany | 198/731 |

Primary Examiner—Robert B. Reeves
Assistant Examiner—Douglas D. Watts
Attorney, Agent, or Firm—Sughrue, Rothwell, Mion, Zinn and Macpeak

[57] ABSTRACT

A scraper assembly for a scraper chain conveyor includes a scraper and a locking member connected together by bolts. The scraper and the locking member are formed with cooperating shaped parts which define a bed for a link of the chain of the conveyor. The bolts are inclined at an acute angle to the plane of said bed.

26 Claims, 7 Drawing Figures

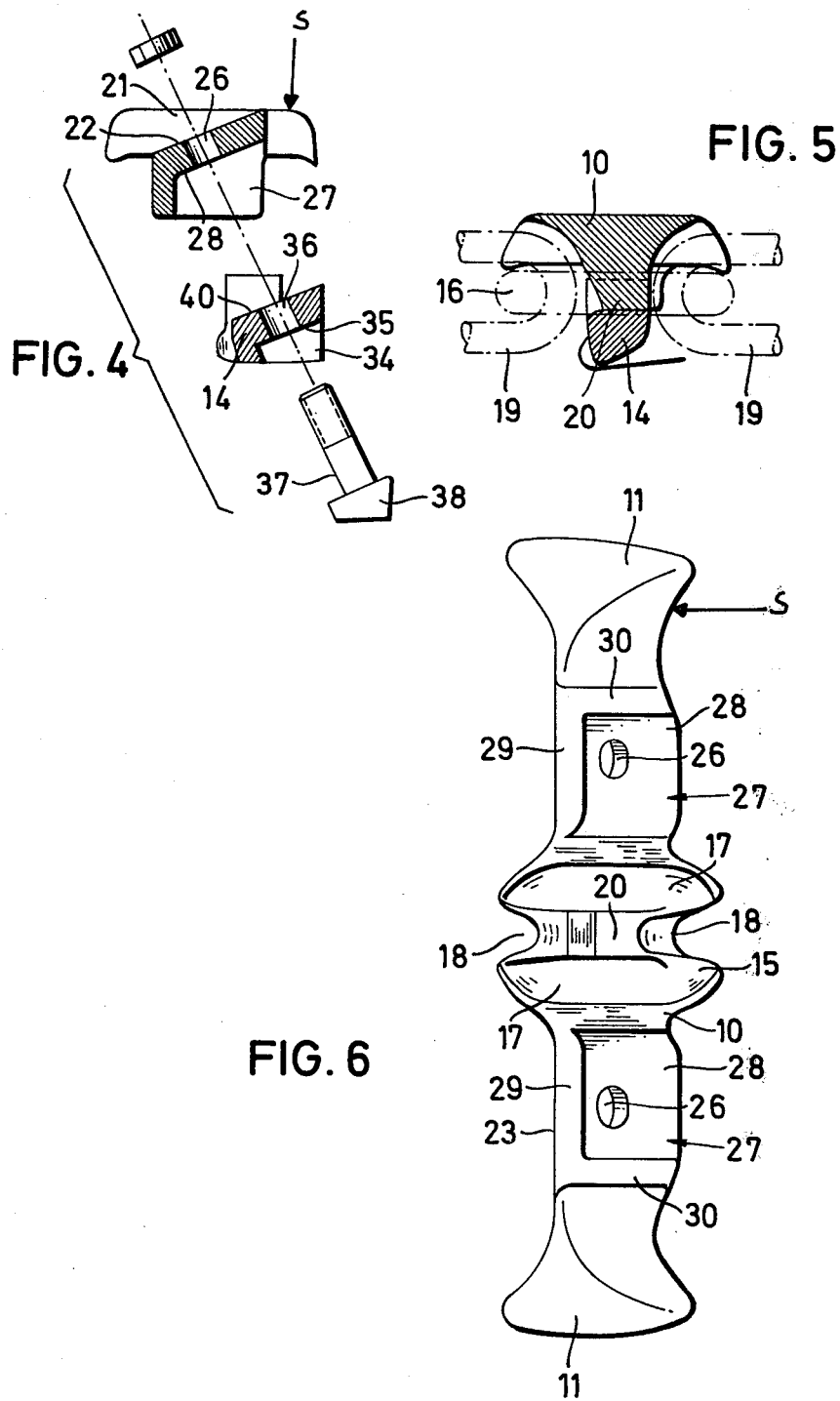

SCRAPER ASSEMBLY FOR A SCRAPER CHAIN CONVEYOR

BACKGROUND TO THE INVENTION

This invention relates to a scraper assembly for a scraper chain conveyor, and in particular to a scraper assembly for a centre-chain scraper chain scraper chain conveyor.

The channel sections which make up the body of a scraper chain conveyor are connected together end-to-end in a manner that permits adjacent sections to move slightly angularly with respect to one another. This slight degree of angular movement is essential to enable the conveyor to adapt itself to irregularities in the floor of mine workings. Unfortunately, this increases the very heavy stresses to which the chain and scraper assemblies are subjected.

A scraper assembly is known which has a scraper and a locking member which are joined together by means of bolts, and which clamp a link of the chain therebetween. For example, the locking member may have bifurcated ends and may be secured to the scraper by means of horizontal bolts which extend through aligned holes in the bifurcated ends of the locking member and vertical web portions of the scraper. (See DT-PS No. 1,217,863).

A similar construction is known for a double-centre-chain scraper chain conveyor, in which the locking member is likewise secured to the scraper by means of horizontal bolts. (DT-OS No. 2,031,876).

It is also known to connect the locking member of a scraper assembly to its scraper by means of vertical bolts. The bolts may, in this case, be formed integrally with the locking member which is of U-shape. Unfortunately, such an arrangement suffers from the disadvantage that the inevitable damage to the bolts and their threads, which results from working in the rough conditions occuring during mining operations, means that entire locking members become unusuable and have to be replaced. Moreover, vertical bolts are subjected to undesirable shear loads. (See DT-PS No. 1,199,690 and DT-AS No. 2,353,906).

However, if horizontal bolts are used for securing the locking members to their scrapers, the fitting and removal of scraper assemblies can cause considerable difficulties, particularly in the restricted conditions prevailing in underground mining workings. This is particularly the case when the scraper assemblies are spaced relatively closely along the drive chain of the conveyor. It is then often difficult, or even impossible, to apply a pneumatic power tool for tightening the nuts on the bolts when fitting the scraper assemblies, of for loosening these nuts when dismantling the scraper assemblies. The difficulties are enhanced when the drive chain follows a curved path. Moreover, the frequent (and unavoidable) jamming of the nuts, which occurs because of damage or corrosion to the threads of the bolts, often causes considerable difficulties.

When vertical bolts are used for securing the locking members to the scrapers, the tools used to tighten and loosen the nuts must be applied thereto from above, and this can cause considerable difficulties, particularly when only a limited working space is available above the conveyor.

The aim of the invention is to provide a scraper assembly which can more easily and more comfortably be fitted and removed, even when there is only a small working space available above the associated conveyor, or when the spacing between adjacent scraper assemblies is relatively small.

SUMMARY OF THE INVENTION

The present invention provides a scraper assembly for a scraper chain conveyor, the assembly comprising a scraper and a locking member which are connectable by means of at least one threaded element, the scraper and the locking member being formed with co-operating shaped parts which define a bed for a link of the chain of the conveyor, wherein the or each threaded element is inclined, in use, at an acute angle to the plane of said bed.

Where the scraper assembly is to be used with a centre-chain scraper chain conveyor, the scraper and locking member may be connectible by means of two threaded elements, and the scraper may be constituted by a central web which interconnects, and is integral with, two wings. In this case, the central web of the scraper may be formed with the bed-defining shaped parts, and the two threaded elements are positioned, in use, symmetrically on either side thereof, and the locking member may have a central web which interconnects, and is integral with, two wings. Advantageously, the threaded elements are bolts which pass through aligned holes in the wings of the scraper and the locking member, said holes being inclined at said acute angle to the plane of said bed.

Preferably, the holes in the wings of the scraper terminate in respective recesses formed in the upper surfaces of said wings, and the base of each of the recesses in the upper surfaces of the scraper wings is inclined at said acute angle to the plane of said bed. Advantageously, each of said recesses houses, in use, a nut, the nuts co-operating with the bolts to connect the scraper to the locking member.

With this form of scraper assembly, the power tool used for tightening or loosening the nuts can be applied obliquely from above. Thus, these operations can be carried out from a considerably better working position than is possible with the known types of scraper assembly. Moreover, these operations are not hampered by the scraper assemblies being closely spaced or if the working space above the associated conveyor is limited. In this connection, the scraper assembly of this invention has the further advantage that the one-piece scraper can be mounted obliquely from above on the locking member which is resting on the conveyor with the bolts already in place. Similarly, when the nuts are removed, the scraper can be removed upwardly and obliquely, so that fitting and removal of this type of assembly is generally rendered much easier even under difficult conditions. Yet another advantage is that, because of their inclined positions, the bolts are not subjected to impermissibly high shear loads. Moreover, the locking members can be re-used even if their bolts are damaged.

Advantageously, the holes in the wings of the locking member terminate in pockets formed in the lower surfaces of said wings, and the top face of each of said pockets is inclined at said acute angle to the plane of said bed. In this case, the pockets house, in use, the heads of the bolts.

The inclined positions of the bolts of the aligned holes in the scraper and the locking member, and of the faces which bear against the nuts and the heads of the bolts, enable the scraper and the locking member to have adequate load-bearing cross-sections. This is important in view of the great stability called for in scraper assemblies. Moreover, the scraper assembly can be incorporated in the chain-run in a firm tension-resisting manner. The nuts are protected by the recesses in the wings of the scraper but are readily accessible. Also, because of the inclined arrangement, the cross-section of the recesses in the scraper wings can be smaller than those necessary when vertical bolts are used.

Advantageously, each of said pockets is shaped to match the shape of the head of the corresponding bolt, and the bolt heads are so shaped that they are locked against rotation when positioned in said pockets. Thus, the bolt heads substantially fill said pockets and are prevented from rotating with the nuts when the latter are tightened or loosened.

The lower surface of the scraper wings may be provided with recessed portions which receive, in use, the wings of the locking member. Preferably, the upper surfaces of said recessed portions and the upper surfaces of the wings of the locking member are inclined at said acute angle to the plane of said bed.

Advantageously, the central web of the scaper interconnects the upper portions of the two scraper wings thereby defining an aperture between the lower portions of the scraper wings, the bed-defining shaped parts of the scraper being formed on the lower surface of the web, and within said aperture. Conveniently, the central web of the locking member has a width which is less than that of the wings of the locking member.

Preferably, said bed is defined by grooves and a projection on the scraper and by two projections on the locking member, the grooves matching the shape of the chain link, the projection on the scraper passing, in use, through the chain link, and the projections on the locking member engaging outer portions of the chain link. Advantageously, each of said projections, is rounded so as to match the profile of the chain link.

The invention also provides a scraper chain arrangement comprising a conveyor drive chain and at least one scraper assembly as defined above, the or each scraper assembly being attached to the chain with a respective chain link clamped in the bed defined by the co-operating shaped parts of the connected-together scraper and locking member of that scraper assembly.

Preferably, the bed of the or each scraper assembly is associated with a link of the chain which, in use, is parallel to the upper conveying surface of the conveyor, and said acute angle is such that the or each threaded element of the or each scraper assembly points upwardly in the direction of movement of the arrangement Advantageously, the pockets of the locking bar of the or each scraper assembly are open both towards the underneath and the rear of the scraper assembly, and each of said pockets is delimited at the front and at the side remote from the centre of that scraper assembly by vertical walls integrally formed with that locking member, the two walls of each pocket being mutually at right-angles. In this arrangement the wings of the locking member are covered and protected behind the front (working) face of the scraper.

Preferably, the central web of the or each locking member is off-set, with respect to its wings, in the direction of movement of the arrangement. When the nuts are removed, this off-setting enables the scraper to be lifted upwardly and obliquely without hindrance.

BRIEF DESCRIPTION OF THE DRAWINGS

A scraper assembly constructed in accordance with the invention will now be described, by way of example, with reference to the accompanying drawings, in which:

FIG. 4 is an exploded cross-sectional view of the scraper assembly;

FIG. 5 is a transverse cross-section through the centre of the scraper of the assembly of FIGS. 1 to 4;

FIG. 6 is an underneath view of the scraper of the assembly of FIGS. 1 to 4.

DESCRIPTION OF PREFERRED EMBODIMENT

Figure 1:
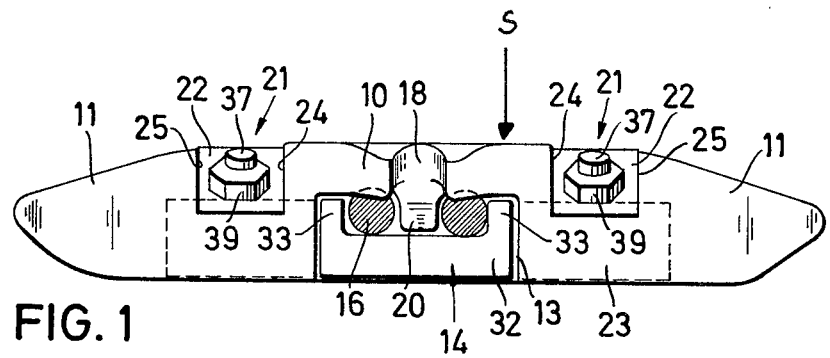
FIG. 1 is a front elevation of the scraper assembly.
Figure 2:
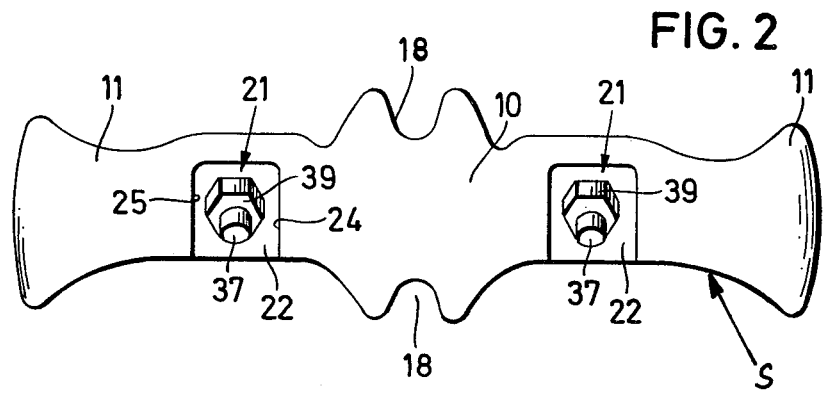
FIG. 2 is a plan view of the scraper assembly.

Referring to the drawings, a scraper assembly is constituted by a scraper S and a locking member or bar 14. The scraper S is formed as a one-piece component, and has a pair of wings 11 interconnected by a central web 10. As seen in FIG. 2, the ends of the wings 11 are widened so as to guide the scraper S in the complementary profiled side walls of the channel sections (not shown) of a scraper chain conveyor with which the scraper assembly is associated. The central web 10 interconnects the wings 11 at the top of the scraper S (See FIG. 3). Thus, a recess 13 is formed below the web 10, this recess housing, in a manner described below, a chain link of the endless central chain of the scraper chain conveyor.

The underneath surface 15 of the web 10 is provided with shaped grooves 17 (see FIG. 6) profiled to match the oval shape of a horizontal link 16 of the chain of the scraper chain conveyor. In practice, a plurality of identical scraper assemblies are secured to the chain at suitable distances apart. The width of the web 10 is somewhat larger than the width of the wings 11 so as to accommodate the chain link substantially completely. The front and rear edge surfaces of the web 10 are each formed with a vertically-extending shaped groove 18 profiled to receive the curved end portion of the adjacent vertical chain link 19 of the chain. A downwardly-extending leg 20 is integrally formed at the centre of the surface 15, this leg extending, with a slight amount of play, through the horizontal chain link 16 (see FIG. 5).

Adjacent to the central web 10, the upper face of each wing 11 is provided with a respective recess 21, the base surface 22 of which is inclined with respect to the horizontal. The base surfaces 22 slope downwardly in the direction of travel of the conveyor, and they terminate at the front, vertical face 23 of the scraper S. Each side of each recess 21 is delimited by a pair of vertical walls 24 and 25 which are perpendicular to the face 23. The base surface 22 of each recess is provided with a bolt hole 26 which extends at right-angles thereto, and which passes right through the scraper S. Each of the bolt holes 26 terminates in a respective recess 27 formed in the underneath of the scraper S. The recesses 27 are formed one on each side of the recess 13. Each recess 27 has a top surface 28 which is parallel to the base surface 22 of the corresponding recess 21 in the top surface of the scraper S. Each recess 27 is delimited, at the front, by a vertical wall 29 which forms part of the front-face 23, and at the side remote from the central web 10, by a vertical wall 30. Each recess 27 is open towards the underneath of the scraper S, towards the recess 13 and towards the rear of the scraper.

Figure 3:
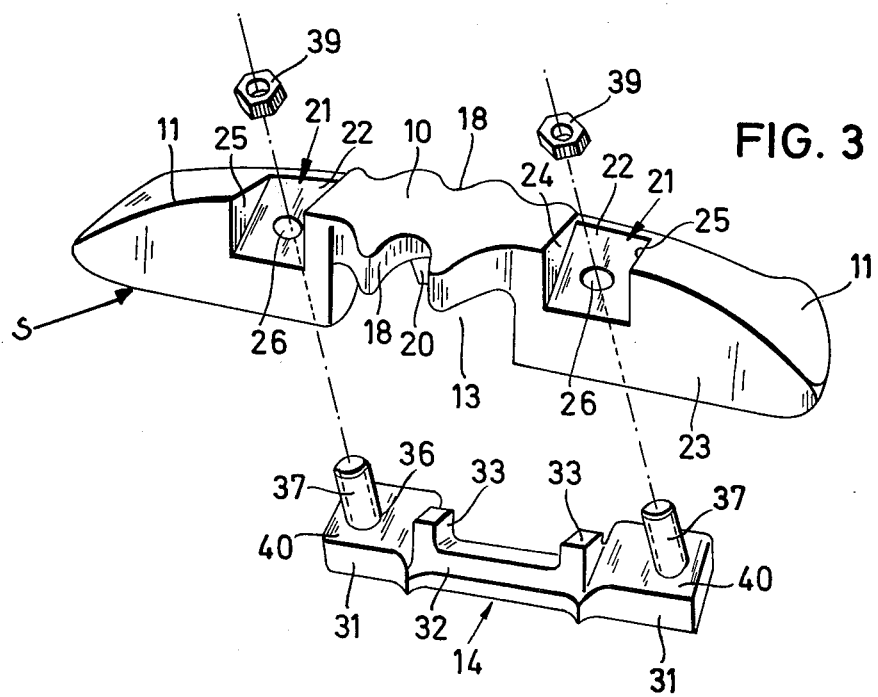
FIG. 3 is an exploded perspective view of the scraper assembly.
Figure 7:
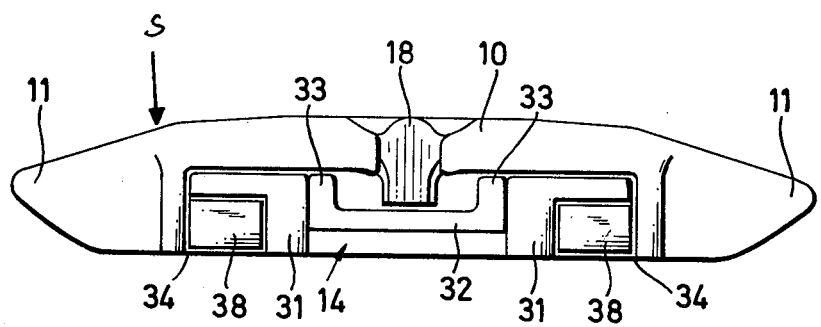
FIG. 7 is a rear elevation of the scraper assembly.

The locking bar 14 is a one-piece component and is constituted by a pair of wings 31 interconnected by a central web 32. As best seen in FIG. 3, the wings 31 are thicker than the web 32, and the web is offset slightly in a direction away from the front face 23 of the scraper S (that is to say in the direction of movement of the conveyor). The central web 32 is provided, where it merges with the wings 31, with upwardly-extending projections 33, the mutually-facing portions of which are contoured to match the shape of the horizontal chain link 16 when the locking bar 14 is fastened to the scraper S with its wings 31 in the recesses 27 and its projections 33 in the recess 13. The projections 33 then co-operate with the grooves 17 and the leg 20 to form a complete bed for the chain link 16.

The underneath surface of each wing 31 of the locking bar 14 is formed with a respective recess 34, the top surfaces 35 of these recesses 34 being inclined at the same angle to the horizontal as the surfaces 22 of the recesses 21 formed in the upper surfaces of the wings 11 of the scraper S. The upper surfaces 40 of the wings 31 are parallel to the top surfaces 35 of the recesses 34, and bolt holes 36 extend through the wings 31 at right-angles to these inclined surfaces 35 and 40. The recesses 34 receive the heads 38 of the two bolts 37 which are used to connect the locking bar 14 to the scraper S. The heads 38 of the bolts 37 are of quadrilateral shape when seen in cross-section (see FIG. 4) and match the shape of the recesses 34. Thus, when the bolts 37 are inserted upwards through the bolt holes 36, their heads 38 are locked against rotation by their engagement with the recesses 34. The chain link 16 is then positioned in the bed defined by the grooves 17, the leg 20 and the projections 33. The scraper S can then be positioned with the bolt holes 26 in its wings 11 in alignment with the bolts 37. In order to complete the fastening of the scraper assembly to the chain, it is now only necessary to push the scraper S down so that the bolts 37 pass through the bolt holes 26 and to tighten up nuts 39 on the threaded ends of the bolts. The nuts 39 are preferably tightened up using a pneumatic power tool which is introduced obliquely, and from above, into the recesses 21 so as to engage with the nuts. In the assembled position, the inclined upper surfaces 40 of the wings 31 of the locking bar 14 lie against the inclined top surfaces 35 of the recesses 27 formed in the underneath of the scraper S, so that the chain link 16 is held firmly in its bed.

I claim:

1. In a scraper chain arrangement for a scraper chain conveyor, the scraper chain arrangement comprising a conveyor drive chain and a plurality of scraper assemblies, each scraper assembly comprising a scraper and a locking member which are connected together by means of threaded elements, the scraper and the locking member being formed with cooperating shaped parts which define a bed for a link of the chain of the conveyor, each scraper assembly being attached to the chain with a respective chain link clamped in the bed defined by cooperating shaped parts of the connected scraper and locking member of each said scraper assembly, the improvement comprising inclining each said threaded element at an acute angle to the plane of said bed and in the direction of movement of the scraper chain arrangement, said threaded elements passing through aligned holes of the scraper and the locking member, said holes being inclined at said acute angle with respect to the plane of said bed and terminating in inclined recesses formed in the upper surface of said scraper.

2. A scraper assembly according to claim 1, wherein the scraper and the locking member are connected by means of two threaded elements.

3. A scraper assembly according to claim 2, wherein the scraper is constituted by a central web which interconnects, and is integral with, two wings.

4. A scraper assembly according to claim 3, wherein the central web of the scraper is formed with said bed-defining shaped parts, and the two threaded elements are positioned symmetrically on either side thereof.

5. A scraper assembly according to claim 3, wherein the locking member has a central web which interconnects, and is integral with, two wings.

6. A scraper assembly according to claim 5, wherein the threaded elements are bolts which pass through aligned holes in the wings of the scraper and the locking member, said holes being inclined at said acute angle to the plane of said bed.

7. A scraper assembly according to claim 6, wherein the holes in the wings of the scraper terminate in respective recesses formed in the upper surfaces of said wings.

8. A scraper assembly according to claim 7, wherein the base of each of the recesses in the upper surfaces of the scraper wings is inclined at said acute angle to the plane of said bed.

9. A scraper assembly according to claim 7, wherein each of said recesses houses a nut, the nuts co-operating with the bolts to connect the scraper to the locking member.

10. A scraper assembly according to claim 6, wherein the holes in the wings of the locking member terminate in pockets formed in the lower surfaces of said wings.

11. A scraper assembly according to claim 10, wherein the top face of each of said pockets is inclined at said acute angle to the plane of said bed.

12. A scraper assembly according to claim 10, wherein the pockets house the heads of the bolts.

13. A scraper assembly according to claim 12, wherein each of said pockets is shaped to match the shape of the head of the corresponding bolt, and wherein the bolt heads are so shaped that they are locked against rotation when positioned in said pockets.

14. A scraper assembly according to claim 5, wherein the lower surfaces of the scraper wings are provided with recessed portions which receive the wings of the locking member.

15. A scraper assembly according to claim 14, wherein the upper surfaces of said recessed portions and the upper surfaces of the wings of the locking member are inclined at said acute angle to the plane of said bed.

16. A scraper assembly according to claim 3, wherein the central web of the scraper interconnects the upper portions of the two scraper wings thereby defining an aperture between the lower portions of the scraper wings, said bed-defining shaped parts of the scraper being formed on the lower surface of the web, and within said aperture.

17. A scraper assembly according to claim 5, wherein the central web of the locking member has a width which is less than that of the wings of the locking member.

18. A scraper assembly according to claim 1, wherein said bed is defined by grooves and a projection on the scraper and by two projections on the locking member, the grooves matching the shape of the chain link, the projection on the scraper passing through the chain link, and the projections on the locking member engaging outer portions of the chain link.

19. A scraper assembly according to claim 18, wherein each of said projections is rounded so as to match the profile of the chain link.

20. A scraper chain arrangement for a scraper chain conveyor, the scraper chain arrangement comprising a conveyor drive chain and a plurality of scraper assemblies each scraper assembly comprising a scraper and a locking member which are connected together by means of threaded elements, the scraper and the locking member being formed with cooperating shaped parts which define a bed for a link of the chain of the conveyor, wherein each said threaded element is inclined at an acute angle to the plane of said bed and in the direction of movement of the scraper chain arrangement, each scraper assembly being attached to the chain with a respective chain link clamped in the bed defined by the cooperating shaped parts of the connected-together scraper and locking member of each said scraper assembly, said threaded elements passing through aligned holes of the scraper and the locking member, said holes being inclined at said acute angle with respect to the plane of said bed and terminating in inclined recesses formed in the upper surface of said scraper.

21. A scraper chain arrangement according to claim 20, wherein the bed of each scraper assembly is associated with a link of the chain which is parallel to the upper conveying surface of the conveyor.

22. A scraper chain arrangement according to claim 21, wherein said acute angle is such that each threaded element of the scraper assembly points upwardly in the direction of movement of the arrangement.

23. A scraper chain arrangement according to claim 22, wherein each scraper is constituted by a central web which interconnects, and is integral with, two wings wherein each locking member has a central web which interconnects, and is integral with, two wings, wherein the threaded elements of each scraper assembly are bolts which pass through aligned holes in the wings of the respective scraper and the respective locking member, said holes being inclined at said acute angle to the plane of said bed, and wherein the holes in the wings of each locking member terminate in pockets formed in the lower surfaces of said wings.

24. A scraper chain assembly according to claim 23, wherein the pockets of the locking member of each scraper assembly are open both towards the underneath and the rear of that scraper assembly.

25. A scraper chain arrangement according to claim 24, wherein each of said pockets is delimited at the front and at the side remote from the centre of the respective scraper assembly by vertical walls integrally formed with that locking member, the two walls of each pocket being mutally at right-angles.

26. A scraper chain arrangement according to claim 23, wherein the central web of each locking member is off-set, with respect to its wings, in the direction of movement of the arrangement.

* * * * *